(12) United States Patent  
Murata (10) Patent No.: US 8,098,986 B2  
(45) Date of Patent: Jan. 17, 2012

(54) CAMERA WITH LIGHT EMITTING FUNCTION

(75) Inventor: Noriyasu Murata, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 730 days.

(21) Appl. No.: 11/655,482

(22) Filed: Jan. 19, 2007

(65) Prior Publication Data

US 2007/0166023 A1 Jul. 19, 2007

(30) Foreign Application Priority Data

Jan. 19, 2006 (JP) .................................. 2006-010576

(51) Int. Cl.
*G03B 15/03* (2006.01)
*H05B 37/00* (2006.01)
(52) U.S. Cl. ...................... 396/157; 396/161; 315/241 P
(58) Field of Classification Search .......... 396/159–163, 396/176, 179, 157; 315/241 P, 241 S
See application file for complete search history.

(56) References Cited

U.S. PATENT DOCUMENTS

| 4,999,663 | A * | 3/1991 | Nakamura | ....................... 396/89 |
| 2003/0164881 | A1* | 9/2003 | Ohe et al. | ................. 348/207.99 |

FOREIGN PATENT DOCUMENTS

| JP | 2002-214692 A | 7/2002 |
| JP | 2003-043550 A | 2/2003 |
| JP | 2003-299108 A | 10/2003 |
| JP | 2004-32681 A | 1/2004 |

OTHER PUBLICATIONS

Translation of 2002-214692.*
Japanese Office Action dated Jul. 26, 2011 (and English translation thereof) in counterpart Japanese Application No. 2006-010576.

* cited by examiner

*Primary Examiner* — Rochelle-Ann J Blackman
(74) *Attorney, Agent, or Firm* — Holtz, Holtz, Goodman & Chick, PC (57) ABSTRACT

For flash photography, a rise of a flash emission control pulse precedes emission timing by a predetermined period. A start of flash emission of a flash lamp precedes a start of exposure of an image sensor. Since the start of the emission is earlier than the start of the exposure, a period of unstable flash emission can be excluded from an exposure time T of the image sensor. The exclusion prevents a captured image from being affected by the period of unstable flash emission. Accordingly, it becomes possible to ensure high color reproducibility for photography with auxiliary light.

24 Claims, 5 Drawing Sheets

CAMERA WITH LIGHT EMITTING FUNCTION

CROSS-REFERENCE TO RELATED APPLICATIONS

This application is based upon and claims the benefit of priority from prior Japanese Patent Application No. 2006-010576, filed Jan. 19, 2006, the entire contents of which are incorporated herein by reference.

BACKGROUND OF THE INVENTION

1. Field of the Invention

The present invention relates to a camera having a light emitting function which emits auxiliary light for image capture, a method to control the emission of auxiliary light for image capture, and a storing medium which stores a program to control emission of auxiliary light for image capture.

2. Description of the Related Art

A conventional image capture apparatus, such as a digital camera or a mobile phone having a camera function, is equipped with an image sensor such as a CCD. Image capture with the conventional image capture apparatus is performed as follows. Before starting exposure, an electronic shutter pulse (charge sweep-out pulse) is continuously supplied to the image sensor so as to sweep out charges accumulated in the image sensor. At the start of exposure, the sweep of the accumulated charges stops. An amount of the charges which is proportional to an amount of incident light is accumulated. Therefore, image data is acquired. Exposure is stopped in such a manner that a mechanical shutter is closed to block the incident light, or the charge sweep is resumed by an electronic shutter function.

The digital camera generally captures an image of an object with automatic emission of a flash when, for example, capturing the image at night. In the flash photography, the flash is automatically emitted according to a flash emission control pulse, immediately after the stop of the electronic shutter pulse. The pulse width of the flash emission control pulse is varied in order to control an emission period within an exposure time. Therefore, the amount of light is adjusted (see Jpn. Pat. Appln. KOKAI Publication No. 2004-32681).

However, when performing the above light amount adjustment, the brightness of the ordinary flash changes with the emission period. The flash light remains unstable at the rising thereof. Namely, the flash light is unstable before the brightness reaches to a half of a waveform peak. When the digital camera is equipped with a flash lamp having a color temperature of about 5,500 K at full emission, the color temperature within the rise time is about 8,000 K and the flash light becomes bluish. Consequently, a shorter emission period causes more bluish flash light and degrades color reproducibility of the captured image.

BRIEF SUMMARY OF THE INVENTION

According to an embodiment of the present invention, a digital camera comprises an image capture element which captures an image of an object, a light emission element which emits light, a light amount setting unit which sets an amount of light to be emitted by the light emission element, and an emission timing controller which controls a light emission timing of the light emission element with respect to an exposure timing of the image capture element in accordance with the amount of light set by the light amount setting unit.

According to another embodiment of the present invention, a light emission control method comprises setting an amount of light to be emitted by a light emission element, determining a light emission timing of the light emission element with respect to an exposure timing of an image capture element in accordance with the set amount of light, and emitting light based on the determined light emission timing.

According to another embodiment of the present invention, a computer program product for use with a digital camera having an image capture element and a light emission element, the computer program product being stored in a computer usable medium including computer readable program means, the computer program product comprises first computer readable program means for setting an amount of light to be emitted by the light emission element, second computer readable program means for determining a light emission timing of the light emission element with respect to an exposure timing of the image capture element in accordance with the set amount of light, and third computer readable program means for emitting light based on the determined light emission timing.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

Embodiments of a digital camera according to the present invention will now be described with reference to accompanying drawings.

First Embodiment

Figure 1:
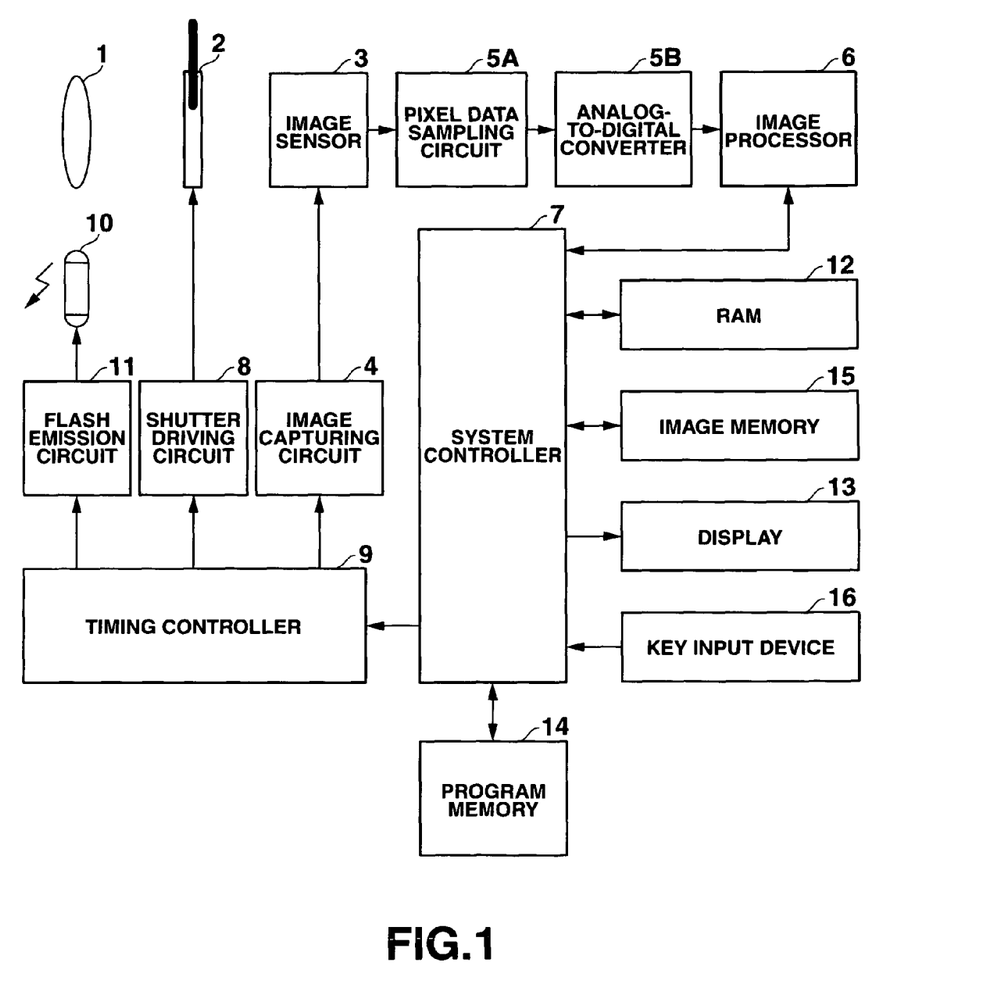
FIG. 1 is a schematic block diagram of a digital camera according to embodiments of the present invention, showing the electric configuration thereof.

A first embodiment of the digital camera according to the present invention is described hereinafter. FIG. 1 is a schematic block diagram showing the electric configuration of the digital camera which is common in embodiments of the present invention. The digital camera includes an optical lens 1, a mechanical shutter 2, an image sensor 3 such as a CCD, an image capturing circuit 4, a pixel data sampling circuit 5A, and an analog-to-digital converter 5B. The optical lens 1 forms an optical image of an object on the image sensor 3 through the mechanical shutter 2. The image capturing circuit 4 drives the image sensor 3. The pixel data sampling circuit 5A reduces noise contained in an image signal output from the image sensor 3 by correlated double sampling. The analog-to-digital converter 5B converts the noise-reduced image signal into a digital signal and outputs the digital signal to an image processor 6.

The optical lens 1 is held by a driving mechanism (not shown) including an AF motor. The optical lens 1 is movable in the direction of an optical axis under the control of a system controller 7. The drive of the optical lens 1 adjusts the focal point thereof to form the optical image onto the image sensor 3. The mechanical shutter 2 is driven in response to a driving signal output from a shutter driving circuit 8. When capturing an image, the mechanical shutter 2 is driven to be closed and blocks incident light at the end of exposure of the image sensor 3.

A timing controller 9 controls operations of the image capturing circuit 4 and the shutter driving circuit 8 on the basis of instructions from the system controller 7. The timing controller 9 controls supply of an electronic shutter pulse (charge sweep-out pulse) from the image capturing circuit 4 to the image sensor 3. The timing controller 9 controls output of the driving signal from the shutter driving circuit 8 to the mechanical shutter 2. When capturing an image using an AE control, the timing controller 9 controls a charge accumulation time of the image sensor 3. A predetermined shutter speed is requested by the system controller 7. The requested shutter speed is realized in such a manner that the timing controller 9 controls the charge accumulation time.

A flash lamp (emission element) 10 is driven by a flash emission circuit 11. The flash emission circuit 11 includes a flash capacitor and a charging circuit of the flash capacitor. The flash emission circuit 11 causes the flash lamp 10 to discharge according to the charges accumulated in the flash capacitor. Consequently, the flash lamp 10 emits auxiliary light. The operation of the flash emission circuit 11 is controlled by the timing controller 9. The timing controller 9 supplies a flash emission control pulse having a predetermined pulse width to the flash emission circuit 11 in response to an instruction from the system controller 7. An emission period of the flash lamp 10 driven by the flash emission circuit 11 is adjusted to correspond with an emission period requested by the system controller 7.

The image signal captured by the image sensor 3 is output to the pixel data sampling circuit 5A. The pixel data sampling circuit 5A removes noise contained in the image signal. The analog-to-digital converter 5B digitizes the image signal and outputs the digitized signal to the image processor 6. The image processor 6 processes the digitized image signal by operations such as a pedestal clamp operation to convert the signal into a luminance (Y) signal and a color difference (UV) signal. Furthermore, the image processor 6 performs digital signal processing such as auto white balance processing, gamma characteristic correction, pixel interpolation processing. The YUV data converted by the image processor 6 is sequentially stored in a random access memory (RAM) 12 under the control of the system controller 7. In a recording mode for image capture, every frame of data (image data) stored in the RAM 12 is converted into a video signal. The video signal is sent to a display device 13 equipped with a liquid crystal monitor or the like. The display device 13 displays the video signal as a monitor image (or through image).

The system controller 7 includes a processor (CPU), an internal memory, and peripheral circuits (none of the components are illustrated). The system controller 7 controls the components of the digital camera using the RAM 12 as a work memory in accordance with various programs stored in a program memory 14. The program memory 14 stores programs for causing the system controller 7 to function as an AE controller and an AF controller. Furthermore, the program memory 14 stores programs for causing the system controller 7 to perform as a light amount controller which controls an amount of auxiliary light of the emitting element, a timing controller which controls timing for starting exposure of the image sensor 3 and for starting emission of the auxiliary light, a determination unit which determines whether or not the amount of auxiliary light is equal to or smaller than a predetermined value, and a selection unit which selects a emission period from the predetermined emission periods, in the processing shown in flowcharts explained below.

The program memory 14 may be rewritable. The data, e.g., the above programs, stored in the rewritable program memory may be rewritten as required. Some of the programs may be stored in an image memory 15.

The system controller 7 controls compression of the YUV data and decompression of compressed image data. When image capture is performed in the recording mode in response to the operation of a shutter key, the system controller 7 compresses the YUV data and generates an image file in a predetermined format. The system controller 7 records the generated image file in the image memory 15. The image memory 15 is a nonvolatile memory such as a flash memory. The image memory 15 is removable or housed in a camera main body. In a playback mode, the system controller 7 reads out the compressed image data (image file) from the image memory 15 and decompresses image data. A recorded image based on the decompressed data is displayed by the display device 13.

A key input device 16 includes various operation keys and switches such as a power key, the shutter key, and a mode switching key for mode switching between the recording mode and the playback mode. When any of the keys is operated, the key input device 16 outputs an operation signal corresponding to the key operation into the system controller 7.

Figure 2:
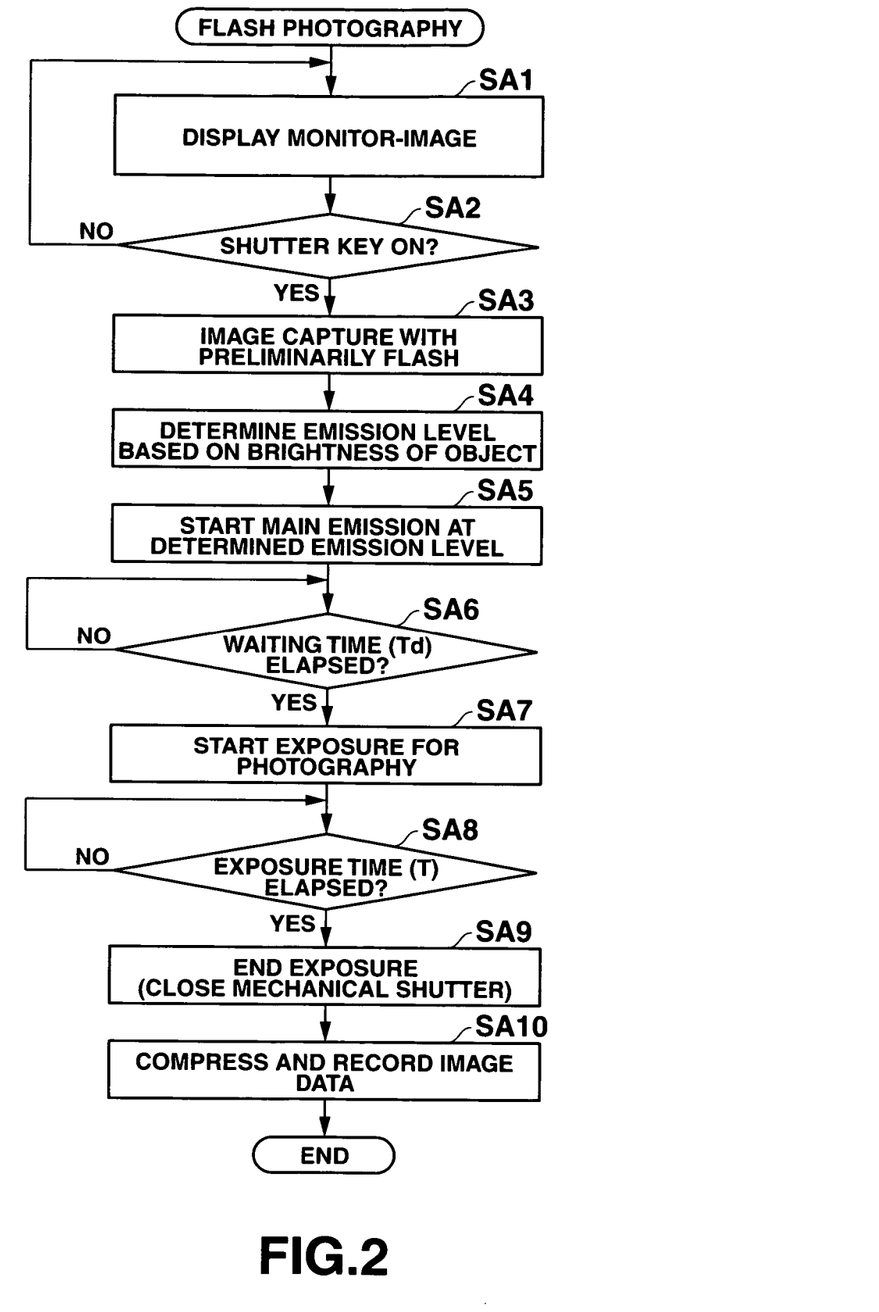
FIG. 2 is a flowchart showing a flash photography process of the digital camera in a first embodiment.
Figure 3:
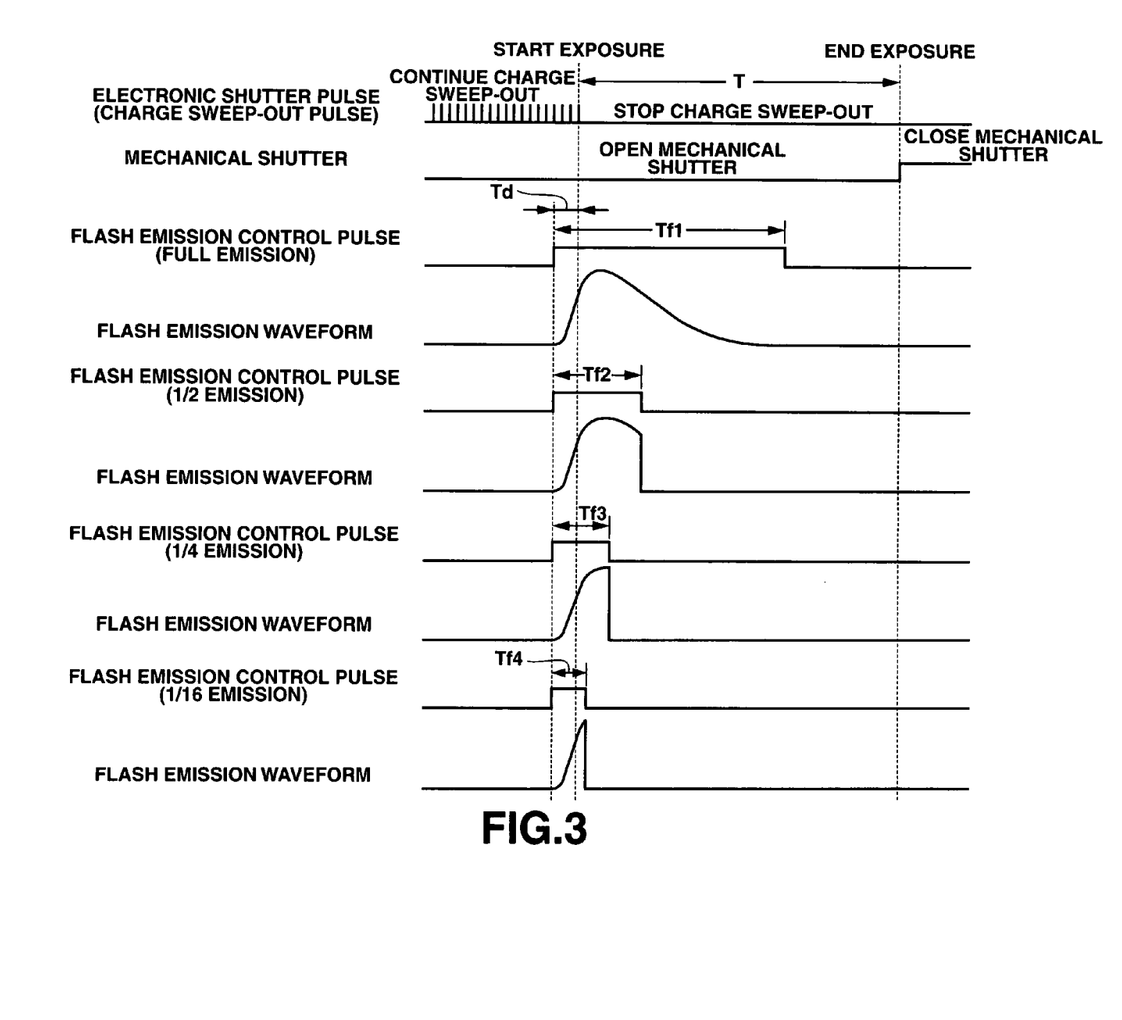
FIG. 3 is a timing chart of the first embodiment.

The operation of the above-described digital camera is explained with reference to a flowchart shown in FIG. 2 and a timing chart shown in FIG. 3. The flowchart in FIG. 2 shows a flash photography process in the recording mode. According to brightness of an object on standby for image capture, the flash lamp 10 automatically emits flash light. The operation performed when it is determined that flash light is not required is omitted in the flowchart.

In the recording mode, the system controller 7 drives the image sensor 3 at a predetermined through-rate and captures an image of an object. The display device 13 sequentially displays the captured image as a monitor image (step SA1). When a user depresses the shutter key (YES in step SA2), the system controller 7 executes image capture causing the flash lamp 10 to preliminarily emit flash light (step SA3). An amount of light for the preliminarily emission is predetermined.

Then, an emission level is determined on the basis of brightness of the object (step SA4). The brightness of the object is derived from a luminance component of the image data captured with the preliminary emission, i.e., luminance (Y) data resulting from the YUV conversion. The emission level indicates the amount of auxiliary light (flash light) to be provided for main emission of the flash lamp 10 in step SA5. In the present embodiment, four emission levels are predetermined, that is, "full emission," "half ($\frac{1}{2}$) emission," "quarter ($\frac{1}{4}$) mission," and "sixteenth ($\frac{1}{16}$) emission." The "full emission" corresponds to the maximum amount of flash light and "$\frac{1}{16}$ emission" corresponds to the minimum amount of flash light. The emission level is determined using a correspondence table which indicates the correspondence between the brightness of the object and the emission level of the main emission. A plurality of brightness level of the object (in the present embodiment, four levels) is predetermined. The correspondence table stores the correspondence between the brightness level of the object and the emission level of the main emission. The emission level is determined as follows. The brightness level of the object is detected in the captured image data. The emission level corresponding to the detected brightness level is determined with reference to the correspondence table.

Subsequently, the main emission of the flash light is started on the basis of the determined emission level (step SA5). The flash lamp 10 generates flash light during a corresponding emission period (Tf1 to Tf4 shown in FIG. 3). The emission periods are predetermined based on the emission levels. To realize the main emission based on the selected emission level, the flash lamp 10 is required to emit flash light during the corresponding emission period. The main emission is carried out as follows. The timing controller 9 generates a flash emission control pulse having a pulse width which coincides with the required emission period (Tf1 to Tf4). The generated flash emission control pulse is output to the flash emission circuit 11. The flash lamp 10 emits flash light during the predetermined emission period.

Subsequently, it is determined whether or not a predetermined waiting time Td has elapsed from the start of the main emission (the time when the flash emission control pulse was output) (step SA6). The waiting time Td is predetermined on the basis of the characteristics of the flash lamp 10 and the flash emission circuit 11 (mainly the emission characteristic of the flash lamp 10). A flash emission waveform of the "full emission" in FIG. 3 expresses the change of brightness according to emission time. The waiting time Td indicates the time required for the brightness of flash light to reach a half of a waveform peak. Namely, the waiting time Td corresponds to an unstable period of emission in which the color temperature of the flash remains low.

When the waiting time Td has elapsed (YES in step SA6), exposure of the image sensor 3 is started for image capture (step SA7). The system controller 7 instructs the timing controller 9 to start the exposure. As shown in FIG. 3, the image capturing circuit 4 stops outputting the electronic shutter pulse (charge sweep-out pulse) to the image sensor 3.

Subsequently, it is determined whether or not an exposure time T has elapsed from the start of the exposure. The exposure time T is predetermined for flash photography. When the exposure time T has elapsed (YES in step SA8), the timing controller 9 is instructed to stop the exposure. The shutter driving circuit 8 then outputs a driving signal to drive the mechanical shutter 2 to be closed. The mechanical shutter 2 is closed and the exposure terminates (step SA9). Thereafter, an image signal is output from the image sensor 3 and digitized. The image data formed by the digitization of the image signal is compressed to generate an image file in a predetermined format. The generated image file is stored in the image memory 15 (step SA10). Thereby, the flash photography terminates.

The flash lamp 10 and the flash emission circuit 11 used in the present embodiment are configured in such a manner that the unstable period at the start of emission is longer than the unstable period at the end of the emission.

In flash photography of the present embodiment, the rise of the flash emission control pulse and the start of emission of the flash lamp 10 (main emission) precede the start of exposure of the image sensor 3 by the waiting time Td. The unstable period of the flash emission can be excluded from the exposure time T of the image sensor 3 by starting the main emission earlier than the start of the exposure. Accordingly, the captured image is hardly affected by the unstable period of the flash emission. High color reproducibility for flash photography can be realized. The effect of the color reproducibility is particularly significant for a shorter flash emission period, for example, in the case where the flash emission level is the "1/16 emission."

In the present embodiment, main emission starts earlier than the start of exposure by the uniform time (waiting time Td) for every emission levels. However, the time interval is not limited to the waiting time Td. The time interval between the emission start and the exposure start may be set according to the emission levels. An emission level corresponding to a longer emission period is less affected by the unstable period of the flash emission. Accordingly, the waiting time Td may decrease step-by-step from the most susceptible emission level ("1/16 emission") to the most unsusceptible emission level ("full emission").

When the waiting time Td is changed depending on the emission level, merely the minimum required period can be excluded from the exposure time T of the image sensor 3. It is possible to inhibit a useless sweep of charges accumulated in the image sensor 3 during the unstable period. Moreover, the exclusion of the unstable period increases the amount of flash light (emission period Tf1 to Tf4) required for exposure. Moreover, the exclusion of the unstable period of emission causes power consumption to increase as well. However, when the waiting time Td is determined according to the emission level, sufficient exposure is realized by the amount of light depending on the waiting time and the power consumption is reduced. Therefore, high color reproducibility for flash photography can be realized without increasing the power consumption.

In the present embodiment, the emission period of the main emission is controlled step-by-step. However, the emission period of the main emission may be controlled in a stepless manner, i.e., proportional to brightness of the object detected with the preliminary emission. When controlling the emission period in the stepless manner, the waiting time Td may remain uniform regardless of the emission period. Alternatively, the waiting time Td may be varied step-by-step or proportional to the emission period.

Second Embodiment

A second embodiment of the digital camera according to the present invention will be described. The same portions as those of the first embodiment will be indicated in the same reference numerals and their detailed description will be omitted.

Figure 4:
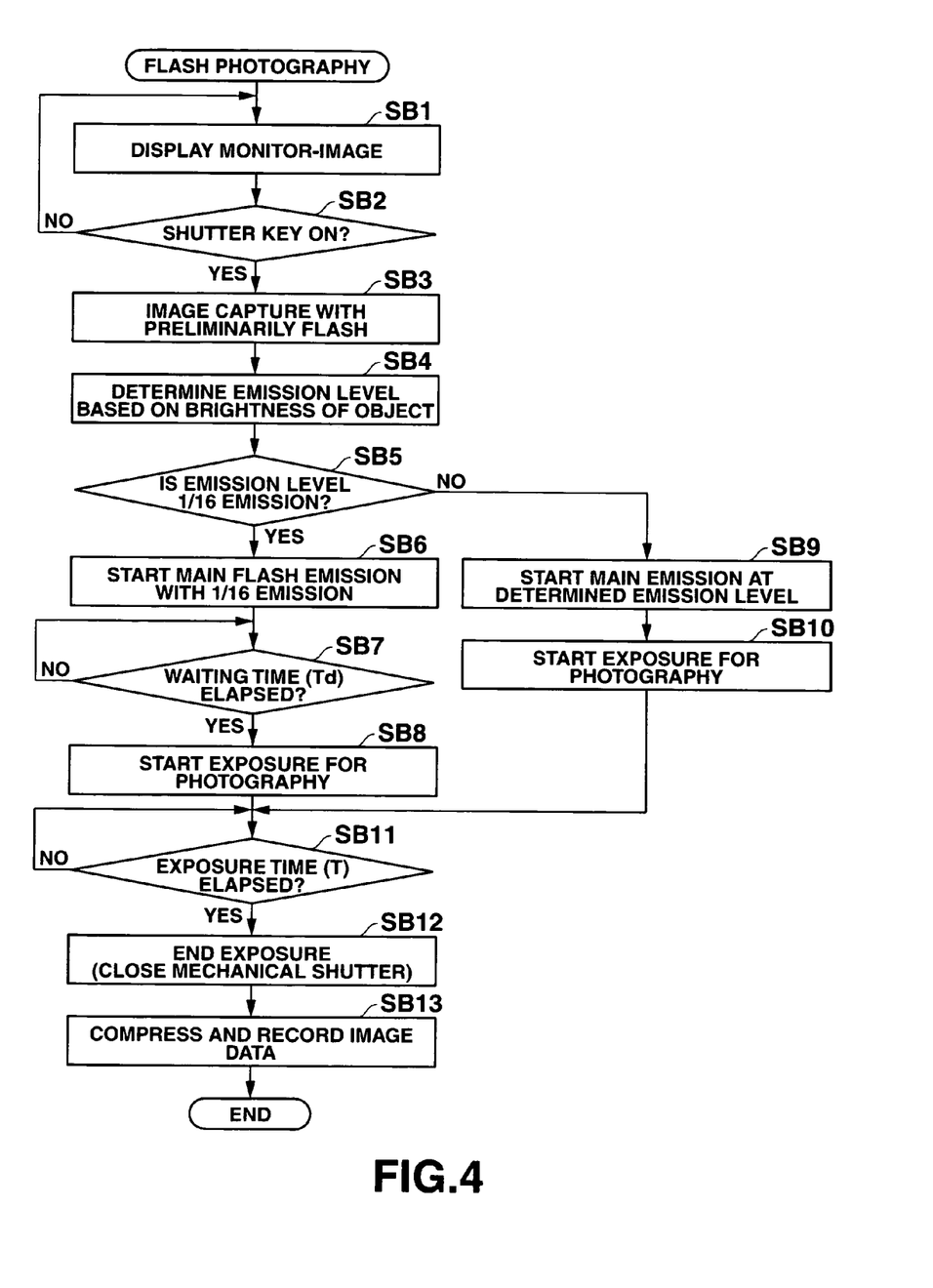
FIG. 4 is a flowchart showing a flash photography process of the digital camera in a second embodiment.

The flowchart in FIG. 4 shows a flash photography process according to the present embodiment. In the digital camera shown in FIG. 1, the program memory 14 stores a program for causing the digital camera to perform the processing shown in FIG. 4.

Figure 5:
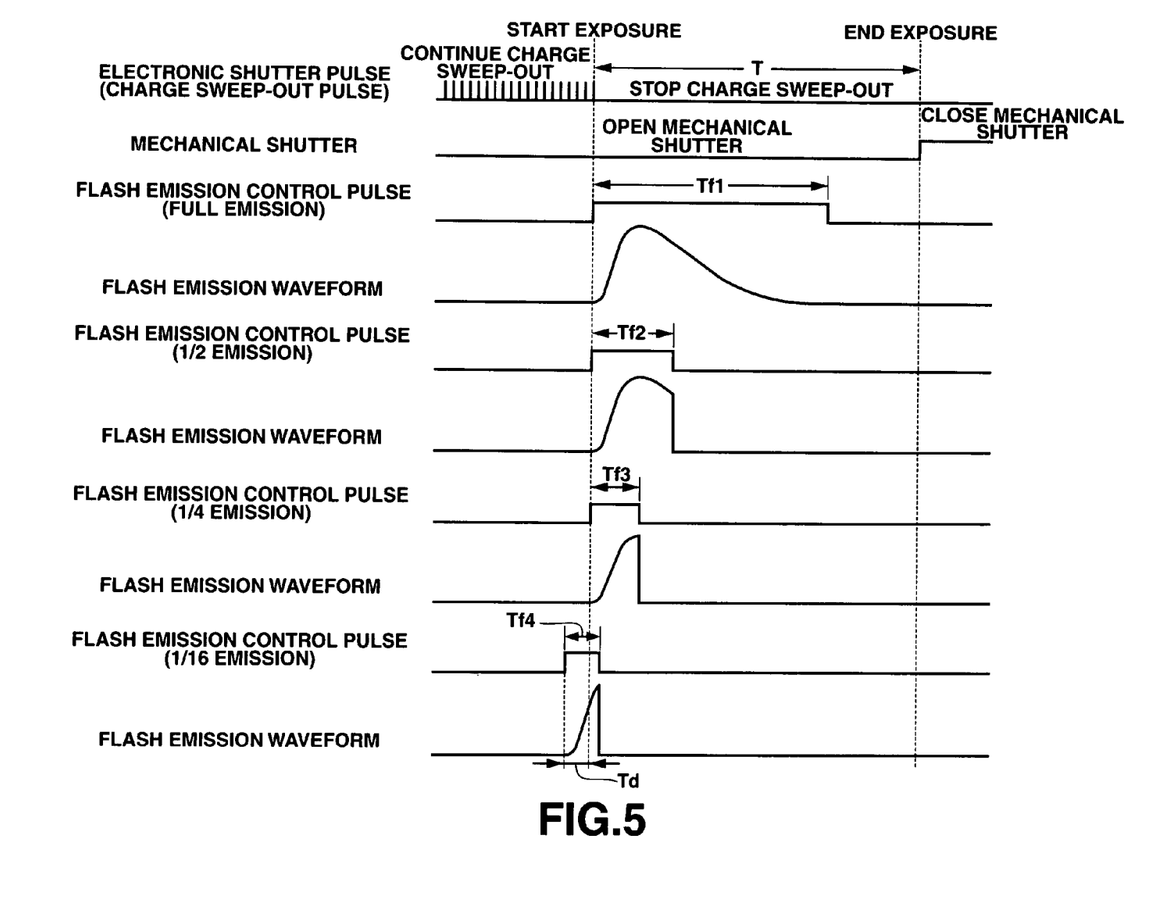
FIG. 5 is a timing chart of the second embodiment.

The operation of the digital camera according to the present embodiment is described with reference to the flowchart shown in FIG. 4 and a timing chart shown in FIG. 5.

The processing from step SB1 to SB4 in the present embodiment is similar to the processing from step SA1 to SA4 in the first embodiment. In the recording mode, an image of an object is captured and displayed as a monitor image (step SB1). When a user depresses the shutter key (YES in step SB2), the system controller 7 executes image capture with preliminarily emission of the flash lamp 10 (step SB3). The system controller 7 determines an emission level for main emission corresponding to brightness of the object (step SB4).

Subsequently, in the present embodiment, it is determined whether or not the emission level determined in step SB4 is the "1/16 emission" (step SB5). In the case where the emission level is the "1/16 emission" (YES in step SB5), i.e., when an unstable period of flash emission exceeds a predetermined percentage of the emission period (when the unstable period of the flash emission is dominant in the emission period), the main emission of the flash lamp 10 based on the "1/16 emission" level is started (step SB6). When the waiting time Td has elapsed (YES in step SB7), exposure of the image sensor 3 is started for photography (step SB8). That is, in the same way as in the first embodiment, the emission (main emission) of the flash lamp 10 is started earlier than the start of the exposure of the image sensor 3 by waiting time Td. In the same way as in the first embodiment, the waiting time Td indicates the time required for brightness of the flash light reaches a half of a waveform peak at the rise of the flash light. The unstable period of the flash emission is excluded from the exposure time T of the image sensor 3.

In the case where the emission level determined in step SB4 is not the "1/16 emission" (NO in step SB5), that is, when the unstable period of the flash emission accounts for a relatively small share of the emission period and is not dominant in the emission period, the main emission of the flash lamp 10 is started based on the emission level determined in step SB4 (step SB9). Then, exposure of the image sensor 3 immediately starts for photography (step SB10).

Regardless of the determined emission level, when a predetermined exposure time T has elapsed (YES in step SB11), the exposure is ended and the captured image is stored in the image memory 15 (steps SB12 and SB13). The flash photography is terminated.

As described above, according to the present embodiment, when the unstable period of flash emission is dominant in the emission period, the main emission is started earlier to exclude the unstable emission period from the exposure time T of the image sensor 3. The exclusion prevents the unstable emission period from affecting the captured image. When the unstable period is not dominant in the emission period, i.e., when the unstable period of the flash emission does not significantly affect the captured image, the exclusion of the unstable period is not performed. The exclusion of the unstable period excludes even the time in which the charge sweep is being continued. The charge sweep in the time to be excluded leads to the unwanted power consumption. By avoiding the exclusion of the unstable period of the flash emission, it becomes possible to prevent the useless charge sweep in the image sensor 3. The avoidance of exclusion prevents the increase of the amount of flash light required for sufficient exposure. Accordingly, the power consumption can be reduced. Therefore, high color reproducibility for flash photography can be provided without increasing the power consumption.

Modifications

Modifications of the second embodiment will be described hereinafter.

In the second embodiment, the start of emission precedes the start of exposure only when the main emission is performed based on the "1/16 emission" level. However, the start of emission may precedes when the other emission level (for example, the "1/8 emission" level) is set, according to the emission characteristic of the flash lamp 10.

In a first modification, regardless of the emission level, the start of emission precedes the start of exposure by a uniform time (waiting time Td). One or more emission levels are preset, and the main emission based on the preset emission level starts before exposure. The main emission in the first modification is performed as follows. The emission level is determined as a result of the image capture with the preliminary emission. When the determined emission level corresponds to one of the preset emission levels and the main emission is required to precede the exposure, the main emission is started earlier than the exposure by the uniform waiting time Td.

In a second modification, the waiting time varies depending on the emission level. For example, the waiting time corresponding to the "1/16 emission" level is set to a time shorter than the waiting time corresponding to the "1/8 emission" level. The information of the waiting time (Td) depending on the respective emission levels is stored in advance. The main emission is controlled as follows. The stored waiting times Td is selected according to the emission level determined as a result of the image capture with the preliminary emission.

It may be determined, based on the emission characteristic of the flash lamp 10 to be used, which of the two modifications is selected or what kind of information is stored. Moreover, the type of the flash lamp 10 may be replaceable. When the flash lamp 10 is replaceable, control information based on plural types of flash lamps is stored in advance. A control method may be selected depending on the type of the exchanged flash lamp.

With the above-described modifications, it becomes possible to deal flexibly with various characteristics of the flash lamps, e.g., unstable periods at the rise of the flash waveform, or the levels of instability.

In the second embodiment, the emission period of the main emission may be proportional to brightness of the object obtained as a result of the image capture with the preliminary emission. In the case where the emission period of the main emission is set to be proportional to the brightness of the object, a predetermined threshold is preset based on the emission characteristic of the flash lamp 10. When the emission period of the main emission is determined to be equal to or smaller than the threshold, the processing from step SB6 to SB8 is performed. When the emission period of the main emission exceeds the threshold, the processing of steps SB9 and SB10 is performed. Accordingly, the power consumption may be reduced.

The present invention is not limited to the above-described embodiments. The present invention may be applied when the user can set the desired light amount and the emission of flash light based on the set light amount is performed for photography.

In the description of the first and second embodiments, the brightness of the object immediately before performing image capture is acquired from the luminance data of the object captured with the preliminary emission. However, when the digital camera includes an optical sensor, which is not included in the above-described embodiments, the optical sensor may be used to acquire the brightness of the object. When the digital camera includes a red-eye prevention function, the brightness of the object may be acquired by a preliminary emission for the red-eye prevention.

In the first and second embodiments, it is described the processing performed when the flash light is automatically emitted in accordance with the brightness of the object in the standby state for photography. However, the present invention may be applied in the case where the flash light is compulsory generated regardless of the brightness of the object.

In the description of the first and second embodiments, the present invention is applied to the digital camera. However, the present invention may be applied to a camera-equipped apparatus which is capable of flash photography, such as a mobile phone having a camera function, a personal digital assistant (PDA) having a camera function. When the present invention is applied to the camera-equipped apparatus, the present invention exerts the same effects as described above.

What is claimed is:

1. A digital camera comprising:
    an image capture element which captures an image of an object;
    a light emission element which emits light for an image capture by the image capture element;
    a light amount control unit which controls an amount of light to be emitted by the light emission element during an exposure period of the image capture element;
    a light emission start controller which starts a continuous light emission by the light emission element before a start of an exposure of the image capture element; and
    an emission timing controller which controls a timing of a start of the continuous light emission by the light emission element with respect to a timing of the start of the exposure of the image capture element, in accordance with the amount of light controlled by the light amount control unit.

2. The digital camera according to claim 1, wherein the light amount control unit controls the amount of the light by changing the continuous light emission by the light emission element during the exposure period of the image capture element.

3. The digital camera according to claim 2, wherein the light emission element is configured such that a time period in which an emission is unstable at the start of the continuous light emission is longer than a time period in which the emission is unstable at an end of the continuous light emission.

4. The digital camera according to claim 2, wherein the light amount control unit controls a continuous emission time of the light emission element by changing a time period which starts with discharge of a charge accumulated in a flash capacitor and ends with termination of the discharge.

5. The digital camera according to claim 4, wherein the light amount control unit changes the continuous emission time by stopping the discharge at any timing while the accumulated charge remains in the flash capacitor.

6. The digital camera according to claim 1, further comprising:
    a determination unit which determines whether or not the amount of light during the exposure period of the image capture element which is controlled by the light amount control unit is smaller than a predetermined amount, and
    wherein when the determination unit determines that the amount of light is smaller than the predetermined amount, the emission timing controller is configured to set a pre-exposure time period of the continuous light emission by the light emission element before the start of the exposure of the image capture element, and when the determination unit determines that the amount of light is not smaller than the predetermined amount, the emission timing controller is configured not to set the pre-exposure time period.

7. The digital camera according to claim 6, wherein the determination unit is configured to determine whether or not the amount of the light controlled by the light amount control unit is such that a period in which the emission is unstable exceeds a predetermined percentage of a period of the continuous light emission, and
    wherein when the determination unit determines that the amount of light is such that the period in which the emission is unstable exceeds the predetermined percentage, the emission timing controller is configured to set the pre-exposure time period, and when the determination unit determines that the amount of light is such that the period in which the emission is unstable does not exceed the predetermined percentage, the emission timing controller is configured not to set the pre-exposure time period.

8. The digital camera according to claim 1, wherein:
    the light emission element gradually increases a brightness of emitted light; and
    the emission timing controller controls the timing of the start of the continuous light emission with respect to the timing of the start of the exposure of the image capture element such that the start of the exposure of the image capture element occurs at a time at which the brightness of the emitted light reaches a predetermined percentage of a maximum brightness of the emitted light.

9. The digital camera according to claim 1, wherein the light amount control unit controls the amount of light to be emitted by the light emission element in accordance with a brightness of the object.

10. The digital camera according to claim 9, wherein the light amount control unit selects one of a plurality of amounts of light in accordance with the brightness of the object.

11. The digital camera according to claim 10, further comprising:
    a selection unit which selects one of a plurality of light emission start timings in accordance with the amount of light selected by the light amount control unit,
    wherein the emission timing controller controls a light emission timing in accordance with the one of the light emission start timings selected by the selection unit.

12. The digital camera according to claim 9, further comprising:
    a specification unit which causes the light emission element to preliminarily emit a predetermined amount of light and specifies the brightness of the object based on luminance information acquired by the image capture element in accordance with the preliminary emission,
    wherein the light amount control unit controls the amount of light based on the specified brightness.

13. The digital camera according to claim 12, wherein the specification unit specifies the brightness of the object when the light is preliminarily emitted in order to prevent red-eye.

14. The digital camera according to claim 9, further comprising:
    a specification unit which specifies the brightness of the object by an optical sensor, wherein the light amount control unit controls the amount of light based on the specified brightness.

15. The digital camera according to claim 1, further comprising:
    an instruction unit which instructs the image capture; and
    an exposure controller which performs the exposure based on an instruction made by the instruction unit; and
    wherein the emission timing controller starts the exposure of the image capture element when a predetermined time has elapsed from when the light emitting element is caused to emit the continuous light in response to the instruction from the instruction unit.

16. The digital camera according to claim 15, wherein the exposure controller starts the exposure by stopping sweep-out of charges accumulated in the image capture element, and terminates the exposure by closing a mechanical shutter.

17. The digital camera according to claim 1, further comprising:
    an instruction unit which instructs the image capture;

an image capture controller which controls the exposure of the image capture element in response to an instruction from the instruction unit to acquire the image; and a recording unit which records the image acquired by the image capture controller with the emission of the light controlled by the light amount control unit and the emission timing controller while the exposure of the image capture element is being performed.

18. The digital camera according to claim 1, wherein the light amount control unit controls the amount of light in accordance with information of a light amount arbitrarily set by a user.

19. The digital camera according to claim 1, wherein the emission timing controller changes the timing of the start of the continuous light emission based on the timing of the start of the exposure of the image capture element in accordance with a characteristic of the light emission element.

20. The digital camera according to claim 1, wherein the emission timing controller is configured to control a presence or absence of a pre-exposure time period of the continuous light emission by the light emission element before the start of the exposure of the image capture element in accordance with the amount of light controlled by the light amount control unit.

21. The digital camera according to claim 1, wherein the emission timing controller is configured to control a length of a pre-exposure time period of the continuous light emission by the light emission element before the start of the exposure of the image capture element in accordance with the amount of light controlled by the light amount control unit.

22. The digital camera according to claim 21, wherein the emission timing controller controls the pre-exposure time period by selecting one of a plurality of periods based on the amount of light controlled by the light amount control unit.

23. A light emission control method comprising:

controlling an amount of light to be emitted by a light emission element;

starting a continuous light emission by the light emission element before a start of an exposure of an image capture element; and controlling a timing of a start of the continuous light emission by the light emission element with respect to a timing of the start of the exposure of the image capture element, in accordance with the controlled amount of light.

24. A non-transitory computer-readable storage medium having a computer program stored thereon that is executable by a digital camera, which comprises an image capture element and a light emission element, the computer program being executable by the digital camera to perform a process comprising:

controlling an amount of light to be emitted by the light emission element;

starting a continuous light emission by the light emission element before a start of an exposure of the image capture element; and controlling a timing of a start of the continuous light emission by the light emission element with respect to a timing of the start of the exposure of the image capture element in accordance with the controlled amount of light.

* * * * *